Jan. 9, 1968  B. L. WILKINSON  3,363,165
TRANSFORMER WITH PLURALITY OF SECONDARY WINDINGS
AND LOW A.C. POTENTIAL THEREBETWEEN
Filed May 20, 1965
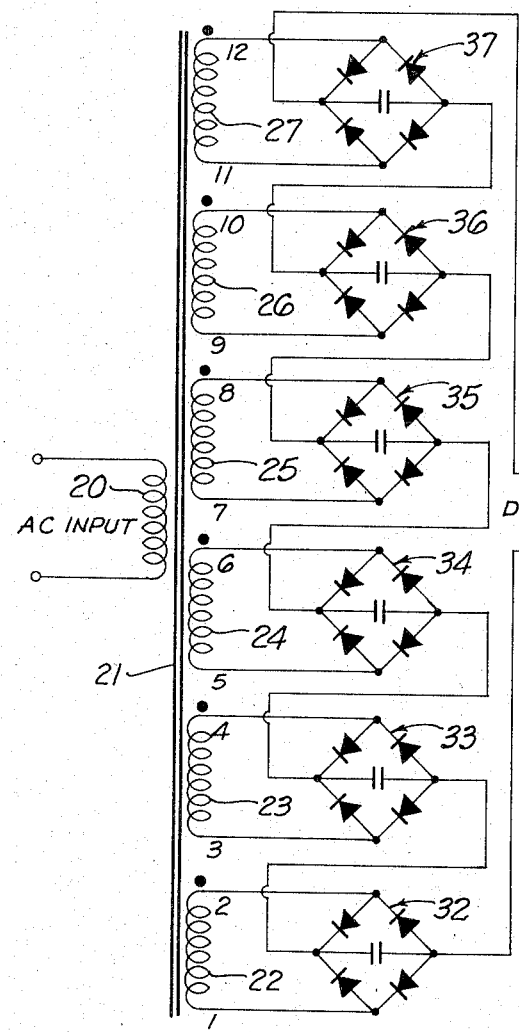
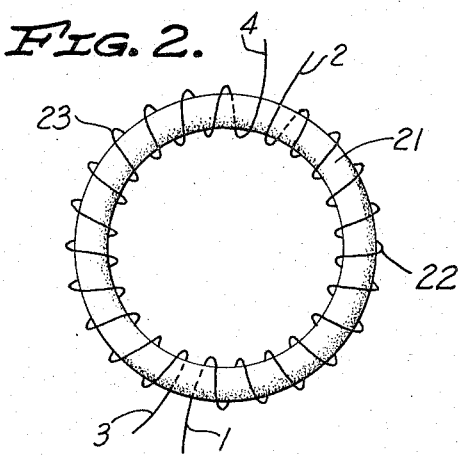
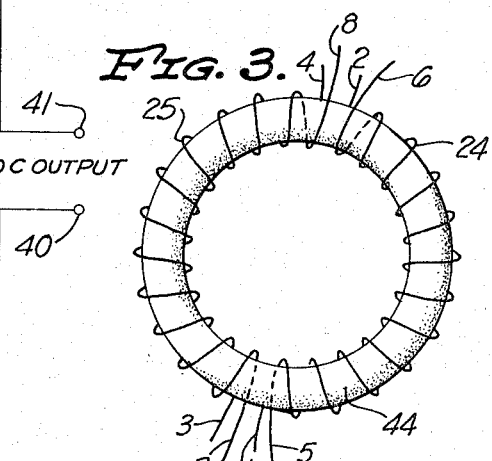
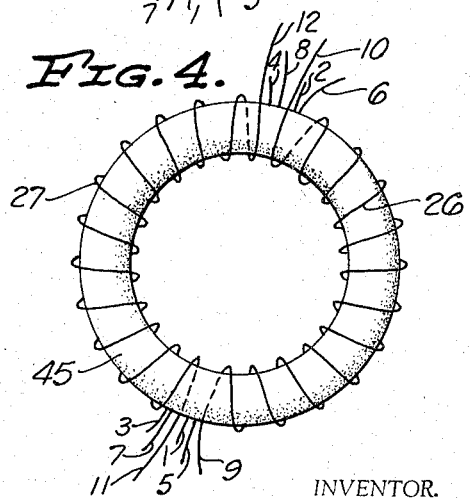
INVENTOR.
BRUCE L. WILKINSON
BY HIS ATTORNEYS
HARRIS, KIECH, RUSSELL & KERN United States Patent Office 3,363,165
Patented Jan. 9, 1968

3,363,165
TRANSFORMER WITH PLURALITY OF SECONDARY WINDINGS AND LOW A.C. POTENTIAL THEREBETWEEN
Bruce L. Wilkinson, Torrance, Calif., assignor to Power Conversion Inc., Long Beach, Calif., a corporation of California
Filed May 20, 1965, Ser. No. 457,361
5 Claims. (Cl. 321—27)

ABSTRACT OF THE DISCLOSURE

A transformer particularly suited for stepup of high frequency A.C. for high voltage D.C. power supplies. A core with a primary winding and a plurality of pairs of secondary windings, with the windings of each pair forming a winding layer on the core with each covering substantially half a layer, with adjacent ends of all the secondary windings having the same A.C. potential and with all the secondary windings phased for aiding flux in the core.

---

This invention relates to rectifier circuits and, in particular, to high voltage rectifier circuits and transformers for use therewith.

Two of the factors which control the size of a transformer are the amount of magnetic material utilized and the amount of insulation required. The amount of iron required is inversely related to the frequency at which the transformer is operated and it is feasible to operate voltage stepup transformers for D.C. power supplies and similar circuits at relatively high frequencies to achieve substantial reductions in the weight of iron or other magnetic material utilized in the core. However, the increase in operating frequency does not result in a similar decrease in the amount of insulation required and in some instances, actually calls for an increase in the amount of insulation. Hence in order for the benefits of a smaller core to be significant, it is highly desirable that the amount of insulation also be reduced. Accordingly, it is an object of the present invention to provide a new and improved rectifier circuit and transformer for use therewith wherein the amount of insulation can be significantly reduced. A particular object is to provide a new and improved transformer for high voltage operation wherein the secondary windings are positioned such that the A.C. stress on the insulation is substantialy eliminated. Another object is to provide a high voltage transformer for use in a rectifier circuit or the like wherein the secondary or output winding is separated into a plurality of individual windings, each appropriately positioned on the core so that adjacent winding ends have the same A.C. potential and so that the insulation stress between windings is no greater than the D.C. output of the individual section.

It is an object of the invention to provide a new and improved transformer having a core with a primary and first and second secondary windings, with each of the secondary windings covering susbtantially half of a winding layer on the core and with adjacent winding ends having the same A.C. potential and with the windings phased for aiding flux in the core. A further object is to provide such a transformer in which additional layers comprising pairs of similar windings may be positioned over the initial layer with adjacent ends of all the secondary windings having the same A.C. potential and with all the secondary windings phased for aiding flux in the core.

It is an object of the invention to provide a transformer having a core and first and second secondary windings thereon, with the first and second windings starting on the core adjacent each other and being wound in the same direction about the core and progressing along the core in opposite directions and terminating adjacent each other. An additional object is to provide such a transformer with additional pairs of secondary windings disposed over the first pair in the same manner.

It is an object of the invention to provide a rectifier circuit incorporating the transformer of the invention and having a rectifier unit for each secondary winding, with each secondary winding connected across the input of the corresponding rectifier unit and with the outputs of the rectifier units connected in series adding relation to provide the desired high voltage D.C. output.

The transformer and rectifier circuit of the present invention are particularly adapted for operation at high frequencies, such as in the range of 20 kilocycles per second to 50 kilocycles per second. However, it should be noted that the invention is not limited to this frequency range and can be utilized at any frequency. Of course, in a 60 cycle per second system, the insulation is not such a major factor and a substantial reduction in the amount of insulation would not result in a corresponding reduction in overall size. In contrast, in the 20 to 50 kilocycle per second range, utilization of conventional winding and insulation techniques sometimes makes the resulting transformer prohibitively large.

Other objects, advantages, features and results will more fully appear in the course of the following description. The drawing merely shows and the description merely describes a preferred embodiment of the present invention which is given by way of illustration or example.

In the drawing:

FIG. 1 is an electrical schematic of a rectifier circuit incorporating the invention; and FIGS. 2, 3 and 4 are diagrams illustrating progressive steps in the winding of the transformer of FIG. 1.

The transformer of FIG. 1 has a primary winding 20 on a core 21 and three pairs of secondary windings on the core. Windings 22, 23 comprise the first pair, windings 24, 25 comprise the second pair, and windings 26, 27 comprise the third pair. While the specific example illustrated herein utilizes three pairs of secondary windings, it should be noted that the invention is equally applicable to a single pair, two pairs, or more than three pairs.

The terminals of the secondary windings 22-27 are identified by numerals 1-12. Each secondary winding is connected across a rectifier unit, here identified as rectifier units 32-37. The rectifier units desirably should be identical in construction and typically each may be a full wave bridge circuit with a filter capacitor connected across the output terminals.

The D.C. outputs of the rectifier units 32-37 are connected in series adding relation to provide the D.C. output of the circuit across terminals 40, 41. A typical rectifier circuit may provide 3,000 volts D.C. at the terminals 40, 41 with each rectifier unit providing 500 volts D.C.

The core 21 of the transformer typically may be a toroid ferrite core, as shown in FIG. 2. The secondary winding 22 is wound on the core 21 covering about one-half thereof, as illustrated in FIG. 2. The winding 23 is wound on the other half of the core 21 in the manner illustrated in FIG. 2. The windings 22, 23 start on the core adjacent each other, as indicated at terminals 1, 3, and are wound in the same direction about the core and progress along the core in opposite directions, terminating adjacent each other, as indicated at terminals 2, 4. When wound in this manner, the voltage from terminal 3 to terminal 4 is the same phase as the voltage from terminal 1 to terminal 2. Therefore, there is no net A.C. potential between terminals 1 and 3 nor between terminals 2 and 4.

A layer 44 of insulation, typically Mylar tape, may be applied over the windings 22, 23. Then winding 24 is wound on the core in the same manner as winding 22 and winding 25 is wound in the same manner as winding 23, producing the structure of FIG. 3. Another layer 45 of insulation may be applied over the windings 24, 25. Then winding 26 may be applied over windings 22 and 24 in the same manner and winding 27 may be applied over windings 23 and 25 in the same manner, producing the structure of FIG. 4. As many layers as desired may be added in this manner. The primary winding may be applied at any time, usually being applied after all of the secondary windings are in place.

With the winding arrangement of the invention, there is no net A.C. potential between any of the terminals 1, 3, 5, 7, 9, 11. Similarly, there is no net A.C. potential between any of terminals 2, 4, 6, 8, 10, 12. Similarly, there is no net A.C. potential between individual wires of windings on different layers. Only a D.C. potential exists between layers.

The transformer and rectifier arrangement of the invention eliminates the high A.C. potential differences normally encountered in a high voltage transformer. This eliminates the high A.C. stress on the dielectric material with the resultant heat and breakdown problems. This also minimizes the corona in insulation due to high A.C. potentials and the resultant problems with insulation life. High A.C. potential stress in insulation shortens the life of insulation much more drastically than corresponding D.C. potential stress, requiring more insulation in devices subject to A.C. stress. Hence the present invention permits manufacture of transformers with considerably less insulation than in conventional ones. In one example, a transformer utilizing a ferrite core about one and one-half inches outside diameter with a core cross section about one-quarter inch in diameter is provided with six secondary windings, 100 turns per winding, to provide 500 volts D.C. per winding with a 3,000 volts D.C. output. The transformer is operated at 22 kilocycles per second A.C. input and the insulation between winding layers is a single layer of Mylar tape .002 inch thick.

The structure of the invention requires little if any insulation at the ends of individual windings. The structure also results in a marked reduction in dielectric losses commonly encountered in high frequency systems, since the A.C. stress is substantially reduced. Also, the effects of distributed winding capacitance are substantially reduced since the A.C. displacement current is reduced. The utilization of a plurality of separate secondary windings with individual rectifier units eliminates the problem of load sharing encountered in high voltage systems which normally utilize a string of rectifier units in series across a single secondary winding.

While the insulation between winding layers has been illustrated herein in the form of tape, it should be noted that any of the conventional types of insulation could be used. Paper-type insulations could be applied in various forms or liquid insulations could be applied by spraying, dipping or the like. For the preferred toroid core construction, a tape form of insulation is preferred.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim as my invention:

1. In a transformer having a core and primary and secondary windings thereon, the improvement comprising in combination:

first and second secondary windings, with said first and second windings starting on said core adjacent each other and being wound in the same direction about said core and progressing along said core in opposite directions and terminating adjacent each other; and third and fourth secondary windings, with said third winding wound over said first winding in the same directions and starting and terminating adjacent the start and end of said first winding, and with said fourth winding wound over said second winding in the same directions and starting and terminating adjacent the start and end of said second winding.

2. In a transformer having a core and primary and secondary windings thereon, the improvement comprising in combination:

a toroidal core;

first and second secondary windings, with said first and second windings starting on said core adjacent each other and being wound in the same direction about said core and progressing along said core in opposite directions and terminating adjacent each other;

a layer of insulation over said first and second windings;

third and fourth secondary windings, with said third winding wound over said first winding in the same directions and starting and terminating adjacent the start and end of said first winding, and with said fourth winding wound over said second winding in the same directions and starting and terminating adjacent the start and end of said second winding;

a layer of insulation over said third and fourth windings; and fifth and sixth secondary windings, with said fifth winding wound over said first and third windings in the same directions and starting and terminating adjacent the start and end of said first and third windings, and with said six winding wound over said second and fourth windings in the same directions and starting and terminating adjacent the start and end of said second and fourth windings.

3. In a rectifier circuit, the combination of:

a transformer having a core and a primary and first, second, third and fourth secondary windings thereon, with said first and second windings starting on said core adjacent each other and being wound in the same direction about said core and progressing along said core in opposite directions and terminating adjacent each other, and with said third and fourth windings starting on said core, with said third winding wound over said first winding in the same directions and starting and terminating adjacent the start and end of said first winding, and with said fourth winding wound over said second winding in the same directions and starting and terminating adjacent the start and end of said second winding;

first, second, third and fourth rectifier units, each having an A.C. input and a D.C. output;

means for connecting each of said secondary windings across the input of the corresponding rectifier unit; and mans for connecting said D.C. outputs in series adding relation.

4. In a rectifier circuit, the combination of:

a transformer having a core and a primary and first, second, third and fourth secondary windings thereon, with said first and second windings forming a winding layer on the core with each covering substantially half of a layer, and with said third and fourth windings forming another winding layer on the core with each covering substantially half of the layer, with adjacent ends of all said secondary windings having the same A.C. potential and with all said secondary windings phased for aiding flux in the core;

first, second, third and fourth rectifier units, each having an A.C. input and a D.C. output;

mans for connecting each of said secondary windings across the input of the corresponding rectifier unit; and means for connecting said D.C. outputs in series adding relation.

5. A transformer having a core with a primary and first, second, third and fourth secondary windings thereon, with said first and second windings forming a winding layer on the core with each covering substantially half of a layer, and with said third and fourth windings forming another winding layer on the core with each covering substantially half of the layer, with adjacent ends of all said secondary windings having the same A.C. potential and with all said secondary windings phased for aiding flux in the core.

References Cited

UNITED STATES PATENTS

| | | | |
|---|---|---|---|
| 2,412,345 | 12/1946 | Lindenblad | 336—182 X |
| 3,008,079 | 11/1961 | Scott | 321—27 |
| 3,195,089 | 7/1965 | Siever et al. | 336—183 |
| 3,196,345 | 7/1965 | Dobsa | 323—48 |
| 3,238,484 | 3/1966 | Dacey | 336—170 X |

FOREIGN PATENTS 1,020,371  11/1952  France.

JOHN F. COUCH, *Primary Examiner.*

G. GOLDBERG, *Assistant Examiner.*